2,745,765

PROCESS OF PRECIPITATING SUBSTANTIALLY ANHYDROUS CALCIUM CHROMATE AND PRODUCT RESULTING THEREFROM

Holbert E. Dunn, Crafton, and Ellis J. O'Brien, Pittsburgh, Pa., assignors to Vanadium Corporation of America, New York, N. Y., a corporation of Delaware No Drawing. Application March 4, 1953,
Serial No. 340,404

11 Claims. (Cl. 106—302)

This invention relates to a process of precipitating substantially anhydrous calcium chromate from sodium chromate solutions and to the product resulting therefrom. The sodium chromate solutions may result from roasting and/or leaching chrome ores, slags, pulverized ferrochromium or other chromium bearing materials. The process relates more particularly to improvements in the precipitation of substantially anhydrous calcium chromate by treating sodium chromate solutions with calcium chloride.

According to a known process, a calcium chloride solution is added to a sodium chromate solution and the mixed solution is heated to precipitate calcium chromate. The reaction may be represented by the following equation:

(1)   $Na_2CrO_4 + CaCl_2 = CaCrO_4 + 2NaCl$

When the reaction is carried out at atmospheric pressure, and completed at a pH of about 6.5–7.0, the product obtained is in the form of the dihydrate $CaCrO_4.2H_2O$ comprising 81.25% $CaCRO_4$ and 18.75% $H_2O$, in yellow monoclinic prismatic or rhombic crystal form. The dihydrate is soluble in water to the extent of 14.0 to 20.3 grams per 100 grams of water at 20° C. Because of its solubility and high water content, this chromate is not suitable for direct application in ceramic and paint pigments as a pyrometallurgical oxidant.

Calcium chromate monohydrate $CaCrO_4.H_2O$ can be made by mixing sodium chromate solution containing, say 75.5 grams per liter chromium with calcium chloride to the extent of an excess of 20 to 50% of theoretical requirements, and heating the mixed solution to boiling. The product is in rhombic crystalline form containing 90.3% calcium chromate and 9.7% $H_2O$, which corresponds closely to the monohydrate $CaCRO_4.H_2O$. However, only about 61% of the chromium content can be precipitated by this method in which the reaction is carried out and completed at a pH of about 6.5 to 7.0.

The present invention provides various improvements in the processes and products heretofore known. 

The calcium chromate product produced in accordance with this invention is in the form of homogeneous, separate, isolated, distinct, discrete, slender needle-like or rod-form crystals, usually of a size order of 5 to 15 microns in diameter by 50 to 150 microns in length. The calcium chromate product is substantially anhydrous and is an isomorphous coprecipitate of calcium chromate and a smaller amount (usually 2.5 to 6.0%) of a sodium aluminosilicate such as albite feldspar having the composition $Na_2O.Al_2O_3.6SiO_2$, or lime-soda feldspar, namely, a combination of this albite with anorthite, $2(CaO.Al_2O_3.2SiO_2)$. These coprecipitated feldspathic compositions not only act as crystal-shaping catalyst or nuclei to insure the formation of the calcium chromate precipitate in the needle-like or rod-form crystals, but confer remarkable bonding power to the precipitated calcium chromate product when it is briquetted by itself or used in a briquetting mix with other nonbinding aggregates. These rod or needle-form crystals have high crushing resistance and are highly inert to rehydration and even to calcination at 1000–1200° F. The calcium chromate product has a remarkably low bulking density of 9 to 21 pounds per cubic foot, as compared to 30 to 55 pounds per cubic foot for atmospheric precipitated cryptocrystalline or rhombic dipyramidal material made according to prior known processes. Our product also is to be contrasted with calcium chromate produced by autoclaving at 3 atmospheres pressure which has a bulking density of 87 pounds per cubic foot and is of the rhombic dipyramidal form. The absolute specific gravity of the individual crystals of our calcium chromate product is from 2.90 to 3.10. This calcium chromate product having only ⅓ to ⅙ the buking density of prior known precipitated calcium chromate, may be distinguished as a "light" grade, as contrasted to the regular "dense" variety.

Our process may be carried out in the following manner:

*Step 1.*—The vapor pressure of the aqueous sodium chromate solution is depressed by adding sodium chloride to the solution in an amount to provide 35 to 70% saturation of the aqueous solvent. In this description all quantities are by weight unless otherwise specifically stated.

*Step 2.*—Sodium silicate solution is then added to the sodium chromate solution. The sodium silicate solution is added slowly so as to prevent hydrolysis of the sodium silicate to free silicic acid, which would not react with the sodium aluminate next added to form sodium aluminosilicate crystal-shaping catalyst and binder, but would appear on the surface of the slurry as a gummy scum. The sodium chromate solution containing NaCl and sodium silicate is hereinafter referred to as "Solution 1."

*Step 3.*—A solution of aluminum sulphate and caustic soda (or its equivalent, sodium aluminate), hereinafter referred to as "Solution 2," is then added to Solution 1. The resulting slurry is maintained at a temperature of 70–190° F. and at a pH of 7.2–12 during a conditioning period for a time sufficient to form nuclei of sodium aluminosilicate. This conditioning period will vary according to the temperature of the slurry. The object of the conditioning period is to form nuclei of sodium aluminosilicate from the sodium silicate and sodium aluminate. If the slurry is at a temperature of 70° F., this conditioning period may require about 15 minutes. If it is at a temperature of 120° F., it may require 10 minutes; if at a temperature of 160° F., a period of 5 minutes; and if at a temperature of 190° F., a period of 2 to 3 minutes. The pH of tthe slurry during this conditioning period must be at least 7.2 and may be as high as 12.0, the preferred pH being 7.4–8.2, and the preferred temperature being 120–190° F.

When Solution 2 is added to Solution 1, the cloudiness first increases and then decreases during the conditioning period. The decrease in cloudiness during the conditioning period indicates the formation of sodium aluminosilicate nuclei, but the solution still remains cloudy during the conditioning period. The reaction for forming the sodium aluminosilicate nuclei is represented by Equation 2 as follows:

Albite feldspar (2)   $3Na_2SiO_3 + 2Al_2(SO_4)_3 + 10NaOH = 2(Na_2O.Al_2O_3.6SiO_2) + 6Na_2SO_4 + 5H_2O$

*Step 4.*—After the nuclei of sodium aluminosilicate have formed during the conditioning period, a solution of calcium chloride containing sodium chloride in an amount to provide 35 to 70% saturation of the aqueous solvent, is mixed with the sodium chromate solution, the calcium chloride amounting to at least 120% of the stoichiometric requirements of calcium chloride for precipitating all of the chromium as calcium chromate. The calcium chloride solution is preheated to a temperature of 120–190° F. before it is mixed with the sodium chromate solution, the preferred temperature of mixing these solutions being about 160° F. The addition of the preheated calcium chloride solution to the sodium chromate solution causes precipitation of a large proportion of the chromium as calcium chromate, the reaction being represented by Equation 3 as follows:

(3) $Na_2CrO_4 + 5NaCl + CaCl_2 = CaCrO_4 + 7NaCl$

If the solutions are mixed at temperatures higher than about 190° F., the rate of calcium chromate precipitation is so rapid that the slurry becomes so thick that agitation of it becomes difficult. Also the absorption of NaCl in the calcium chromate product increases rapidly at temperatures above 190° F., requiring increased water washing of the precipitate and increasing the chromium loss in the wash water in order to control chloride content in the product to the desired 0.50% maximum. High temperatures of mixing the calcium chloride solution with the sodium chromate solution produce small crystals, whereas low temperatures produce large crystals. The precipitation of large crystals has a less tendency to occlude or absorb impurities such as sodium and/or calcium chlorides. If the calcium chloride solution is mixed with the sodium chromate solution at a temperature below about 120° F., the precipitation is so slow as to be economically unfeasible.

If the calcium chloride solution is mixed with the sodium chromate solution at a temperature of about 160° F., precipitation of approximately 80% of the chromium content as calcium chromate occurs in about 1 minute.

The reaction of sodium silicate, aluminum sulphate and sodium hydroxide to form sodium aluminosilicate, as represented by Equation 2, is sluggish. Likewise, the reaction of sodium silicate with sodium aluminate to form sodium aluminosilicate, is sluggish. The formation of calcium chromate from sodium chromate and calcium chloride, as represented by Equation 3, is very rapid. Accordingly, in order to obtain coprecipitation of the sodium aluminosilicate and the calcium chromate, it is necessary to employ the conditioning period for forming the nuclei of sodium aluminosilicate prior to the addition of the calcium chloride solution to the sodium chromate solution. When this conditioning period is employed, and the solutions contain sodium chloride in sufficient amount, precipitation of crystalline albite feldspar by Reaction 2 occurs simultaneously and apparently isomorphously with the precipitation of anhydrous calcium chromate crystals by Reaction 3.

The slurry is then heated to a higher temperature in the neighborhood of the boiling point, which is about 225° F. Preferably the heating is carried out at a temperature of about 215–225° F. During precipitation of the calcium chromate, the pH of the slurry becomes lower. Samples of the slurry are analyzed from time to time and if its pH falls below 8.2, it is adjusted to this value by adding caustic soda solution and then heating is continued until precipitation is completed.

*Step 5.*—Thereafter the slurry is separated, for example, by filtration, and is then washed and dried.

In place of using a calcium chloride solution, we may use calcium chloride in solid form, in which case it is not necessary to mix sodium chloride with the calcium chloride. It is, nevertheless, necessary to add the sodium chloride to the sodium chromate solution in order to depress the vapor pressure.

The following are specific examples of the manner in which our invention may be carried out.

EXAMPLE 1

In this example we started with commercial grade sodium bichromatic crystals, $Na_2Cr_2O_7.2H_2O$, and made a sodium chromate solution from it by adding caustic soda. This sodium bichromate was dehydrated so that it contained 37.85% chromium.

205 kgs. of anhydrous sodium bichromate containing 37.85% Cr were dissolved in 800 liters of water at 70° F. to give a concentration of 86.4 grams per liter chromium. This solution had a pH of about 4.5

55 kgs. of caustic soda flake (76% $Na_2O$) were added to the sodium bichromate solution and then 8 kgs. of caustic soda in the form of a 10% NaOH solution, were added to insure complete conversion of the bichromate to monochromate $Na_2CrO_4$, as indicated by orange to yellow color change. The pH of the adjusted solution was 7.8.

The solution was heated to 120° F. and 200 kgs. of NaCl were added. This provided about 68% saturation of the aqueous solvent.

34.5 kgs. of 40° Baumé sodium silicate (28.8% $SiO_2$ by weight) were added slowly to the solution. After about 75% of the sodium silicate had been added, the solution became cloudy. The sodium chromate solution containing NaCl and sodium silicate is hereinafter referred to as "Solution 1."

10 kgs. of aluminum sulphate, $Al_2(SO_4)_3.18H_2O$, technical grade, and 10 kgs. caustic soda flake (76% $Na_2O$) were dissolved in water, and the solution diluted to 200 liters with water. This formed sodium aluminate containing excess caustic soda. This solution is hereinafter referred to as "Solution 2."

A solution was made of:

340 kgs. calcium chloride, technical grade, 74–77% $CaCl_2$
200 kgs. sodium chloride
1000 liters water The amount of sodium chloride used in this example provided 55% saturation of the aqueous solvent. This solution is referred to hereinafter as "Solution 3."

Solution 2 was added to Solution 1 with agitation, resulting in a pH of 11.2 and a temperature of about 120° F. Heat was then applied to bring the cloudy solution to 160° F. in about 5 minutes, this step being the conditioning period for forming nuclei of sodium aluminosilicate.

Solution 3 was heated to 160° F. and, while stirring, it was added to the mixture of Solutions 1 and 2 in a period of about 1 minute, causing the precipitation of approximately 80% of the chromium content as calcium chromate in that period. The addition of the calcium chloride solution lowered the pH of the slurry to about 8.7.

The slurry was then heated to 215° F. in a period of 20 minutes and maintained at that temperature for 5 minutes. The boiling point of the slurry was about 225° F.

The progress of the precipitation is illustrated by the following sequential analyses at 5-minute intervals:

Table

| Sample No. | Cumulative Time in Minutes After Adding Solution 3 | Slurry Temp., °F. | Conc. of Filtrate, Grams Cr Per Liter | pH of Filtrate Referred to 70° F. | Precipitation Efficiency Based on Residual Cr in Filtrate |
|---|---|---|---|---|---|
| 1 | 5 | 169 | 2.91 | 8.70 | 94.76 |
| 2 | 10 | 188 | 1.60 | 8.80 | 97.12 |
| 3 | 15 | 204 | 1.00 | 8.90 | 98.20 |
| 4 | 20 | 215 | 0.85 | 8.95 | 98.47 |
| 5 | 25 | 215 | 0.80 | 8.50 | 98.56 |

The hot slurry was filtered on a suction filter to give a cake of 70% moisture, which was then washed with 2½ displacement washes with hot water (160° F.) to give 867.3 kgs. of wet filter cake at 70% moisture, or 358 kgs. when dried to 27% moisture, ordinarily found desirable for incorporating the calcium chromate product with other briquetting aggregates. The recovery of chromium in the product amounted to 98.56%. A sample of the product dried at 230° F. to equilibrium moisture content, analyzed as follows:

54.19% $CrO_3$=28.18% Cr=84.54% $CaCrO_4$
34.44% CaO
0.97% $Na_2O$
0.84% $Al_2O_3$
2.98% $SiO_2$
0.50% Cl
1.81% $SO_3$
5.17% ignition loss (1700° F.)

In filtering the precipitated slurry, 1385 liters of strong filtrate containing 0.85 kg. of chromium, and 1538 liters of weak wash filtrate containing 4.34 kgs. of chromium, were recovered. The strong filtrate was discarded primarily because of its low chromium concentration, but the weak wash filtrate could be reused in solution make-up instead of water. This practice would permit 2 to 4.5% additional chromium recovery and would decrease the sodium chloride net requirements to about 50% of those given in the example.

The precipitated calcium chromate product made from impure commercial-grade reagents in accordance with the specific example which has been given, had an analysis which may be stated as follows:

84.54% $CaCrO_4$, anhydrous yellow needle-form
4.35% albite feldspar binder ($Na_2O.Al_2O_3.6SiO_2$) at $\frac{3.55}{1}$, $\frac{SiO_2}{Al_2O_3}$ isomorphously coprecipitated
3.08% gypsum, $CaSO_4$ isomorphously coprecipitated
5.03% calcite, $CaCO_3$, isomorphously coprecipitated
0.82% NaCl
2.06% $H_2O$ at 1000° F., over required for gypsum Micro-examination of this calcium chromate product disclosed a uniform, regular, discrete, yellow, prismatic needle-form crystallinity devoid of excess binder or other foreign structure, and having a loose or "stricken" bulking density of 17.20 pounds per cubic foot and an absolute specific gravity of 3.08. When reagents of higher chemical purity are employed in the process, the gypsum and calcite impurities are correspondingly reduced, and the product analyzes typically 90 to 97% $CaCrO_4$ depending on the amount of binder present; while the discrete crystals tend to form in more regular and finer rod-like needles, 12 to 14 pounds per cubic foot in bulking density and 3.05 absolute specific gravity.

The $SO_3$ content of the product can be reduced by using purer aluminum sulphate than the technical grade employed in the example. Also, instead of forming the sodium aluminate from aluminum sulphate and caustic soda, sodium aluminate itself may be employed.

In order to produce a calcium chromate product having a low content of calcium carbonate, caustic soda low in $CO_2$ should be used so that there will not be much $CO_2$ available for reacting with the calcium chloride.

EXAMPLE 2

Sodium chromate liquor was obtained by water-leaching a soda-lime roasted chrome ore, at a pulp density of 37.5% solids by weight, the sodium chromate liquor having a pH of 12.6 and analyzing:

66.47 grams/liter chromium
0.18 gram/liter $SiO_2$
1.74 grams/liter $Al_2O_3$ 495 liters of this solution was heated to 80° F. and 50 liters of hydrochloric acid (1:1=25 liters at 1.19 sp. g. and 38% HCl+$H_2O$ to 50 liters) added to give a pH of 6.9 and a heavy flocculent precipitate of natural alumina (from the ore). The slurry was boiled 3 minutes and the precipitate of natural alumina altered off and discarded. The pH was then readjusted by the addition of 5 kgs. of flake caustic soda to give a pH of 8.0, whereupon 66 kgs. of sodium chloride was added, followed by 2 liters of 1:1 hydrochloric acid to give the desired pH at this point of 7.4. (Due allowance being made for the NaCl formed by the HCl treatment.) This solution was then heated to 120° F. and 13.8 kgs. of 40° Bé. sodium silicate (28.8% $SiO_2$ by weight) was added slowly to the solution. This solution is hereinafter referred to as "Solution 1."

65 liters of sodium aluminate (Solution 2) was then added to Solution 1 with agitation, resulting in a pH of 11.2 and a temperature of 120° F.

Heat was then applied to bring the cloudy solution to 160° F. in 5 minutes, whereupon Solution 3 (132 kgs. of calcium chloride, 83 kgs. of sodium chloride and 385 liters of water) and preheated to 160° F. was added to the mixture of Solutions 1 and 2, while stirring, in a period of about 1 minute, then heating was continued with stirring to 215° F. in 15 minutes, holding for 15 minutes longer at temperature, then filtering and washing. There was obtained a 99.1% precipitating efficiency and a pH of the filtrate of 8.6. 94.4% of the chromium input was actually recovered in the product dried at 230° F. and analyzing as follows:

83.40% $CaCrO_4$=27.80% Cr
3.15% $SiO_2$
0.89% $Al_2O_3$
0.70% $Na_2O$
0.08% Cl=0.13% NaCl or 0.07% $Na_2O$ so that approximately 0.67% $Na_2O$+0.89% $Al_2O_3$+3.15% Si=4.67% sodium alumino silicate binder was present which corresponds to the molecular formula $$1.2Na_2O.Al_2O_3 6.02SiO^2,$$

and the product showed the typical uniform, regular, discrete, yellow, prismatic needleform crystallinity devoid of excess binder or other foreign structure.

EXAMPLE 3

A sodium chromate liquor was obtained by soda-leaching soda-lime roasted and ground ferrochromium. The sodium chromate liquor had a pH of 11.8 and analyzed:

71.74 grams/liter chromium
2.84 grams/liter $SiO_2$
0.13 gram/liter $Al_2O_3$ with silica and alumina in reverse ratio as compared to the "converted" ore liquor of Example 2.

In adjusting the pH of this solution to the value of 7.4 desired for precipitation, sufficient hydrochloric acid was added to eliminate $CO_2$ residual from the sodium carbonate used in leaching the calcine, otherwise undue contamination of the product by calcium carbonate would result.

Accordingly, 500 liters of the above liquor was heated to 80° F. and 70 liters of hydrochloric acid (1:1) was added to give a pH of 6.8, then 10 kgs. of caustic soda was added to give a pH of 9.1 with a considerable precipitate of flocculent natural silica forming, which was not filtered off, but subsequent allowance was made for it, in making the sodium silicate addition.

Another 15 liters of 1:1 hydrochloric acid was added in increments to bring the pH to 7.5.

Allowing for the sodium chloride formed by the acid neutralization, only 63.6 kgs. of sodium chloride was added and the solution heated to 120° F., when 9.66 kgs. of 40° Bé. sodium silicate was added to complete Solution 1.

74 liters of sodium aluminate (Solution 2) was then added to Solution 1, with agitation, resulting in a pH of 11.2 and a temperature of 120° F.

Heat was then applied to bring the cloudy solution to 160° F. in 5 minutes, and Solution 3 (157 kgs. calcium chloride, 92.6 kgs. of sodium chloride and 462 liters of water) preheated to 160° F. was added, while stirring, to the mixture of Solutions 1 and 2 in a period of about 1 minute, then continuing to heat, with stirring, to 220° F. in 25 minutes, holding at temperature for 15 minutes longer before filtering and washing. There was obtained a 96.0% precipitating efficiency and a pH of the filtrate of 5.6—while 88.6% of the chromium input was actually recovered in the product, dried at 230° F., to analyze as follows:

79.65% $CaCrO_4$=26.55% Cr
2.70% $SiO_2$
0.84% $Al_2O_3$
0.57% $Na_2O$
0.02% Cl=0.02% $Na_2O$ so that approximately 0.55% $Na_2O$+0.84% $Al_2O_3$+2.70% $SiO_2$=4.09% sodium alumino-silicate binder of the molecular formula 1.1$Na_2O.Al_2O_3.5.46SiO_2$ was present in the product and the product showed the typical uniform, regular, discrete, yellow, prismatic needle-form crystallinity devoid of excess binder and other foreign structure.

In carrying out our invention, it is preferred that the feldspathic crystal shaping catalyst-binder constitute from 2.5 to 6.5% by weight of the calcium chromate product. In general, the $SiO_2$ content should be between 2.3% and 4.5% and the $Al_2O_3$ content should be between 0.65% and 1.2% of the calcium chromate product.

This application is related to our copending applications Serial Nos. 340,401, 340,402 and 340,403, all filed March 4, 1953.

The invention is not limited to the preferred embodiment but may be otherwise embodied or practiced within the scope of the following claims.

We claim:

1. The process of precipitating a substantially anhydrous calcium chromate product, which comprises dissolving in a sodium chromate solution an amount of sodium chloride to provide 35 to 70% saturation of the aqueous solvent, adding sodium silicate solution to the sodium chromate solution, adding sodium aluminate solution to the sodium chromate solution, maintaining the slurry at a temperature of 70–190° F. during a conditioning period for a time sufficient to form nuclei of sodium aluminosilicate and at a pH of 7.2–12, adding calcium chloride in an amount of at least 120% of the stoichiometric requirements of calcium chloride for precipitating calcium chromate, and heating the resulting slurry to a temperature of 200–225° F. to precipitate a substantially anhydrous coprecipitate containing calcium chromate and sodium aluminosilicate.

2. A process according to claim 1, wherein the slurry is maintained during the conditioning period at a pH between 7.4 and 8.2.

3. A process according to claim 1, wherein the slurry is maintained during the conditioning period at a temperature between 120 and 190° F.

4. A process according to claim 1, wherein the slurry is maintained during the conditioning period at a pH between 7.4 and 8.2 and at a temperature between 120 and 190° F.

5. The process of precipitating a substantially anhydrous calcium chromate product, which comprises dissolving in a sodium chromate solution an amount of sodium chloride to provide 35 to 70% saturation of the aqueous solvent, adding sodium silicate solution to the sodium chromate solution, adding sodium aluminate solution to the sodium chromate solution, maintaining the slurry at a temperature of 70–190° F. during a conditioning period of at least 2 minutes to form nuclei of sodium alumino-silicate and at a pH of 7.2–12.0, adding calcium chloride in an amount of at least 120% of the stoichiometric requirements of calcium chloride for precipitating calcium chromate, and heating the resulting slurry to a temperature of 200–225° F. to precipitate a substantially anhydrous coprecipitate containing calcium chromate and sodium aluminosilicate.

6. The process of precipitating a substantially anhydrous calcium chromate product, which comprises dissolving in a sodium chromate solution an amount of sodium chloride to provide 35 to 70% saturation of the aqueous solvent, adding sodium silicate solution to the sodium chromate solution, adding sodium aluminate solution to the sodium chromate solution, maintaining the slurry at a temperature of 70–190° F. during a conditioning period for a time sufficient to form nuclei of sodium aluminosilicate and at a pH of 7.2–12.0, dissolving in a calcium chloride solution an amount of sodium chloride to provide 35 to 70% saturation of the aqueous solvent, adding the calcium chloride solution in an amount of at least 120% of the stoichiometric requirements of calcium chloride for precipitating calcium chromate, and heating the resulting slurry to a temperature of 200–225° F. to precipitate a substantially anhydrous coprecipitate containing calcium chromate and sodium aluminosilicate.

7. A process according to claim 6, wherein the calcium chloride solution is at a temperature of 120–190° F. when it is added to the sodium chromate solution.

8. In a process of precipitating a calcium chromate product by mixing calcium chloride with a solution of sodium chromate and heating the solution, the improvement for preparing the sodium chromate solution in order to precipitate, when calcium chloride is added to it and the solution is heated, a substantially anhydrous calcium chromate product in crystalline needle-form having low bulking density and being an isomorphous coprecipitate of calcium chromate and sodium aluminosilicate crystal shaping catalyst and binder, which improvement comprises dissolving in the sodium chromate solution an amount of sodium chloride to provide 35 to 70% saturation of the aqueous solvent, adding sodium silicate solution and sodium aluminate solution to the sodium chromate solution, and maintaining the solution at a temperature of 70–190° F. and at a pH of 7.2–12.0 during a conditioning period for a time sufficient to form nuclei of sodium aluminosilicate.

9. A process according to claim 8, wherein the sodium silicate solution and sodium aluminate solution are in amounts to give 2.3–4.50% $SiO_2$ and 0.65–1.2% $Al_2O_3$ by weight in the final precipitated calcium chromate product.

10. A needle-form substantially anhydrous calcium chromate product comprising a homogeneous, isomorphous coprecipitate of calcium chromate and sodium aluminosilicate crystal-shaping catalyst and binder, said product characterized by a bulking density of 9 to 21 pounds per cubic foot, and self-bonding power when moistened with water and compressed and when used as a bond with other non-binding materials.

11. A calcium chromate product according to claim 10, wherein the sodium aluminosilicate crystal-shaping catalyst and binder is of the approximate molecular formula $Na_2O.Al_2O_3.6SiO_2$ and amounts to 2.5–6.5% by weight of the calcium chromate product.

(References on following page)

References Cited in the file of this patent

UNITED STATES PATENTS

| | | |
|---|---|---|
| 1,660,696 | Wallin | Feb. 28, 1928 |
| 2,276,314 | Kirk | Mar. 17, 1942 |
| 2,276,315 | Kirk | Mar. 17, 1942 |
| 2,395,472 | Fernald | Feb. 26, 1946 |
| 2,493,789 | Udy | Jan. 10, 1950 |

OTHER REFERENCES

Chemical Process Industries (Shreve); pub. by McGraw-Hill Book Co., Inc., N. Y., N. Y. (1945); page 498 is relied upon.

Barrer et al.: "J. of Chem. Society," May 1952, pp. 1561–71.